US012698026B2

(12) United States Patent
Strieter et al.

(10) Patent No.: US 12,698,026 B2
(45) Date of Patent: Aug. 4, 2026

(54) VEHICLE STEERING SYSTEM HAVING MULTI-STAGE REDUCTION MECHANISM

(71) Applicant: HL MANDO CORPORATION, Pyeongtaek-si (KR)

(72) Inventors: Troy Strieter, Bay City, MI (US); Joshua Grove, Bay City, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 1025 days.

(21) Appl. No.: 17/720,176

(22) Filed: Apr. 13, 2022

(65) Prior Publication Data

US 2023/0331286 A1 Oct. 19, 2023

(51) Int. Cl.
*B62D 3/02* (2006.01)
*B62D 5/04* (2006.01)

(52) U.S. Cl.
CPC .............. *B62D 3/02* (2013.01); *B62D 5/0421* (2013.01); *B62D 5/0442* (2013.01)

(58) Field of Classification Search
CPC ...... B62D 3/02; B62D 5/0421; B62D 5/0442; B62D 5/0424; B62D 5/0412; B62D 5/0403; B62D 5/0415; B62D 5/0448; F16H 1/08; F16H 19/003; B60Y 2400/307
See application file for complete search history.

(56) References Cited

U.S. PATENT DOCUMENTS

| | | | |
|---|---|---|---|
| 11,873,037 B2 * | 1/2024 | Washnock | B62D 3/10 |
| 2020/0339183 A1 | 10/2020 | DeHoff et al. | |
| 2021/0261188 A1 * | 8/2021 | Ko | B62D 3/08 |

FOREIGN PATENT DOCUMENTS

| | | |
|---|---|---|
| CN | 205396208 | 7/2016 |
| CN | 106891987 | 6/2017 |
| CN | 109955896 | 7/2019 |

(Continued)

OTHER PUBLICATIONS

Office Action (1st) dated Dec. 20, 2025 for Chinese Patent Application No. 202310386120.9 and its English translation by Google Translate.

*Primary Examiner* — Jason D Shanske
*Assistant Examiner* — Al-Birr Rahman Chowdhury
(74) *Attorney, Agent, or Firm* — WOMBLE BOND DICKINSON (US) LLP

(57) ABSTRACT

A vehicle steering system comprises: an input shaft rotatable in response to an input for moving vehicle wheels; a motor generating torque to be supplied to an output shaft through a belt assembly; a gear assembly; a rotary-linear conversion mechanism, and a sector gear; and the rotary-linear conversion mechanism combining rotary motion of the input shaft and the torque transferred from the motor. The torque generated by the motor can be transferred to the output shaft through the belt assembly, the gear assembly, the rotary-linear conversion mechanism, and the sector gear, thereby improving mechanical efficiency, reducing back-drive torque, and providing a multi-stage reduction mechanism to generate required pitman torque from the motor. The combined use of the belt assembly, the gear assembly, the rotary-linear conversion mechanism, and the sector gear enables to the motor to generate required steering torque, while meeting system back-drive performance requirements and current draw power requirements.

12 Claims, 5 Drawing Sheets

(56)          References Cited

FOREIGN PATENT DOCUMENTS

| CN | 111615482 | 9/2020 |
|----|-----------|--------|
| CN | 111776064 | 10/2020 |
| CN | 112041216 | 12/2020 |
| CN | 112660234 | 4/2021 |
| CN | 112829825 | 5/2021 |
| CN | 214823591 | 11/2021 |
| JP | 2004-196034 | 7/2004 |

* cited by examiner

100

105

180

110

200

CONTROLLER

185

190

195

195

200

200

200

200

VEHICLE STEERING SYSTEM HAVING MULTI-STAGE REDUCTION MECHANISM

BACKGROUND

Various embodiments of the present disclosure generally relate to steering control systems for vehicles and, more particularly, vehicle steering systems having a multi-stage reduction mechanism for power steering.

Vehicles require a steering system to control the direction of travel. Mechanical steering systems have been used. The mechanical steering systems typically include a mechanical linkage or a mechanical connection between a steering wheel and vehicle's road wheels. For example, in a conventional steering system, which consists of a steering wheel, a steering column, a power assisted rack and pinion system, and tie rods, the driver turns the steering wheel which, through the various mechanical components, causes the road wheels of the vehicle to turn. Thus, movement of the steering wheel causes a corresponding movement of the road wheels.

Movement of such mechanical systems is often power assisted through the use of a hydraulic assist. A power steering may include an actuator that helps an operator or driver steers the vehicle by augmenting steering effort needed to turn the road wheels, making it easier for the vehicle to turn. The actuator of the power steering can add controlled power to the mechanical steering mechanism, so that the operator or driver can provide less effort to turn the road wheels when driving at typical speeds, and reduce considerably the physical effort necessary to turn the vehicle wheels when the vehicle is stopped or moving slowly. The power steering can also be engineered to provide some artificial feedback of forces acting on the steering wheel.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, a vehicle steering system may comprise: an input shaft configured to be rotatable in response to an input for moving one or more vehicle wheels; a motor configured to selectively generate torque to be supplied to an output shaft through a belt assembly, a gear assembly, a rotary-linear conversion mechanism, and a sector gear; the rotary-linear conversion mechanism operably connected with the input shaft and the motor, the rotary-linear conversion mechanism configured to convert rotary motion, caused by one or combination of rotary motion of the input shaft and the torque transferred from the motor, to linear motion; the belt assembly comprising a belt configured to be rotatable by the torque generated by the motor; the gear assembly comprising one or more gears configured to be rotatable in response to rotary motion of the belt, wherein rotary motion of one of the gears causes the rotary motion of the rotary-linear conversion mechanism which is converted to the linear motion by the rotary-linear conversion mechanism; and the sector gear operably connected with the output shaft, the sector gear configured to convert the linear motion of the rotary-linear conversion mechanism to rotary motion so that the sector gear rotates the output shaft in response to the linear motion of the rotary-linear conversion mechanism.

The torque generated by the motor can be transferred to the output shaft through the belt assembly, the gear assembly, the rotary-linear conversion mechanism, and the sector gear, thereby improving mechanical efficiency, reducing back-drive torque, and providing a multi-stage reduction mechanism to generate the required pitman torque from an EPS motor. The combined use of the belt assembly, the gear assembly, the rotary-linear conversion mechanism, and the sector gear can enable to an electric motor to generate required steering torque, while meeting system back-drive performance requirements and current draw power requirements. Further, the combined use of the belt assembly, the gear assembly, the rotary-linear conversion mechanism, and the sector gear can provide the optimized force assistance to oppose system and vehicle loads to aid an operator or driver in achieving the desired output.

The rotary-linear conversion mechanism may comprise: a rotatable part coupled to the input shaft to be rotated in association with the rotation of the input shaft; and a translatable part configured to be linearly movable in response to rotation of the rotatable part, the translatable part operably coupled to the sector gear so that linear motion of the translatable part of the rotary-linear conversion mechanism is converted to the rotary motion by the sector gear.

The rotatable part of the rotary linear conversion mechanism may be a ball screw and the translatable part of the rotary linear conversion mechanism may be a ball nut, and the rotary-linear conversion mechanism may further comprise rolling bodies movably disposed between the ball screw and the ball nut.

The belt assembly may further comprise a drive pulley and a driven pulley which are rotatably connected to each other via the belt, the drive pulley of the belt assembly may be formed on or coupled to a shaft of the motor so that rotary motion of the shaft of the motor can cause rotation of the drive pulley of the belt assembly, and the driven pulley of the belt assembly may be coupled to an other of the gears of the gear assembly so that rotary motion of the driven pulley of the belt assembly can cause rotation of the other of the gears which causes rotation of the one of the gears.

A diameter of the driven pulley of the belt assembly coupled to the other of the gears may be greater than a diameter of the drive pulley of the belt assembly coupled to the shaft of the motor.

The belt assembly may comprise a driven pully configured to be rotatable by the belt, the driven pully coupled to an other of the gears which is meshed with the one of the gears, and the one of the gears may be operably coupled to the rotatable part of the rotary-linear conversion mechanism so that rotary motion of the one of the gears causes rotation of the rotatable part of the rotary-linear conversion mechanism.

A diameter of the other of the gears which is coupled to the driven pulley of the belt assembly may be smaller than a diameter of the one of the gears which is coupled to the rotatable part of the rotary-linear conversion mechanism.

The output shaft may be operably connected to a pitman arm to rotate the pitman arm in response to rotary movement of the output shaft.

The vehicle steering system may further comprise a sensor configured to detect motion or torque at the input shaft.

The shaft of the motor and the input shaft may be parallel to each other.

The input shaft may be fixedly coupled to and axially aligned with a rotatable part of the rotary-linear conversion mechanism, the motor may be operably connected to the rotatable part of the rotary-linear conversion mechanism so that the torque generated by the motor can be transferred to the rotatable part of the rotary-linear conversion mechanism through the belt assembly and the gear assembly, and the rotary-linear conversion mechanism is configured to combine the rotary motion of the input shaft and the torque transferred from the motor.

The one of the gears of the gear assembly may be a spur gear or a helical gear fixedly attached to the input shaft or a rotatable part of the rotary-linear conversion mechanism.

The vehicle steering system may further comprise a connecting shaft fixedly connecting the driven pulley of the belt assembly to the other of the gears of the gear assembly.

The input shaft may be operably coupled with a steering column so that rotation of a steering wheel causes the input shaft to rotate.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use. As used herein, designation of any component as "first" or "second" is arbitrary and non-limiting. As used herein, the terms "couple" mean to directly or indirectly connect, attach, fasten, and/or join to members or parts together, whether fixedly, permanently, detachably, and/or in a fashion that the parts are immovable or movable relative to one another unless specified otherwise. As used herein, the terms "connect" mean to directly or indirectly couple, attach, fasten, and/or join to members or parts together, whether fixedly, permanently, detachably, and/or in a fashion that the parts are immovable or movable relative to one another unless specified otherwise.

Figure 1:
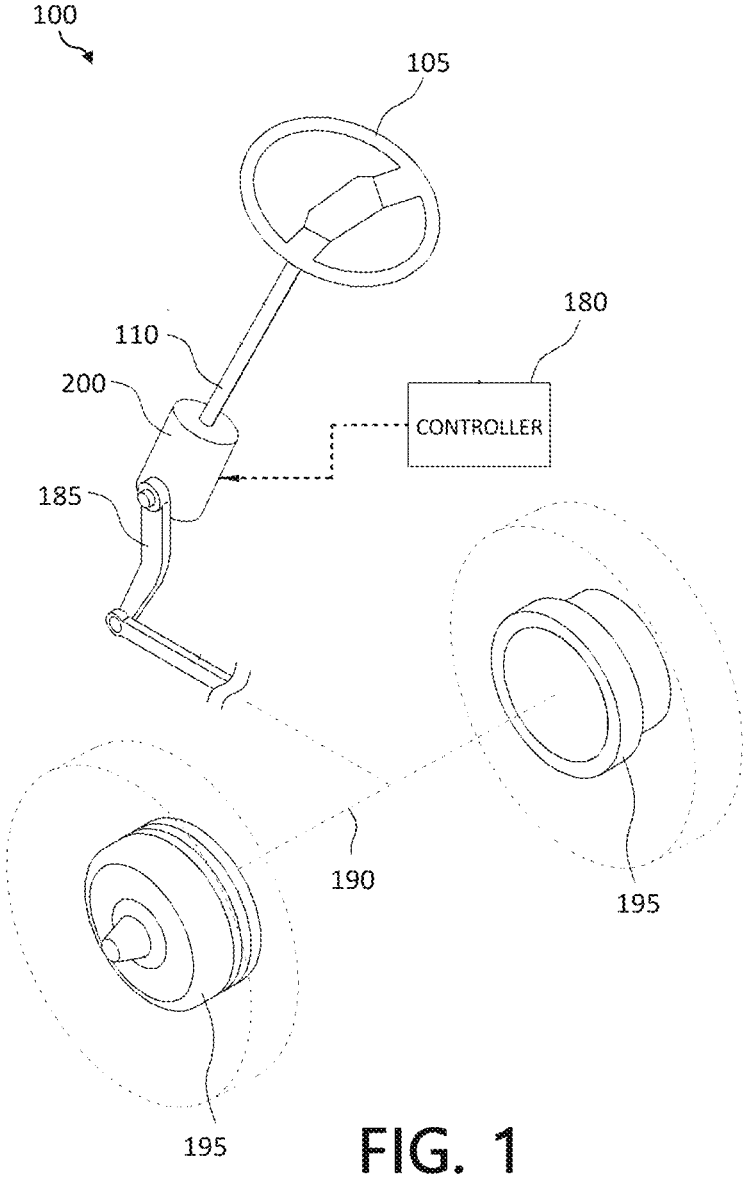
FIG. 1 is a conceptual view of a vehicle steering system according to an exemplary embodiment of the present disclosure.
Figure 2:
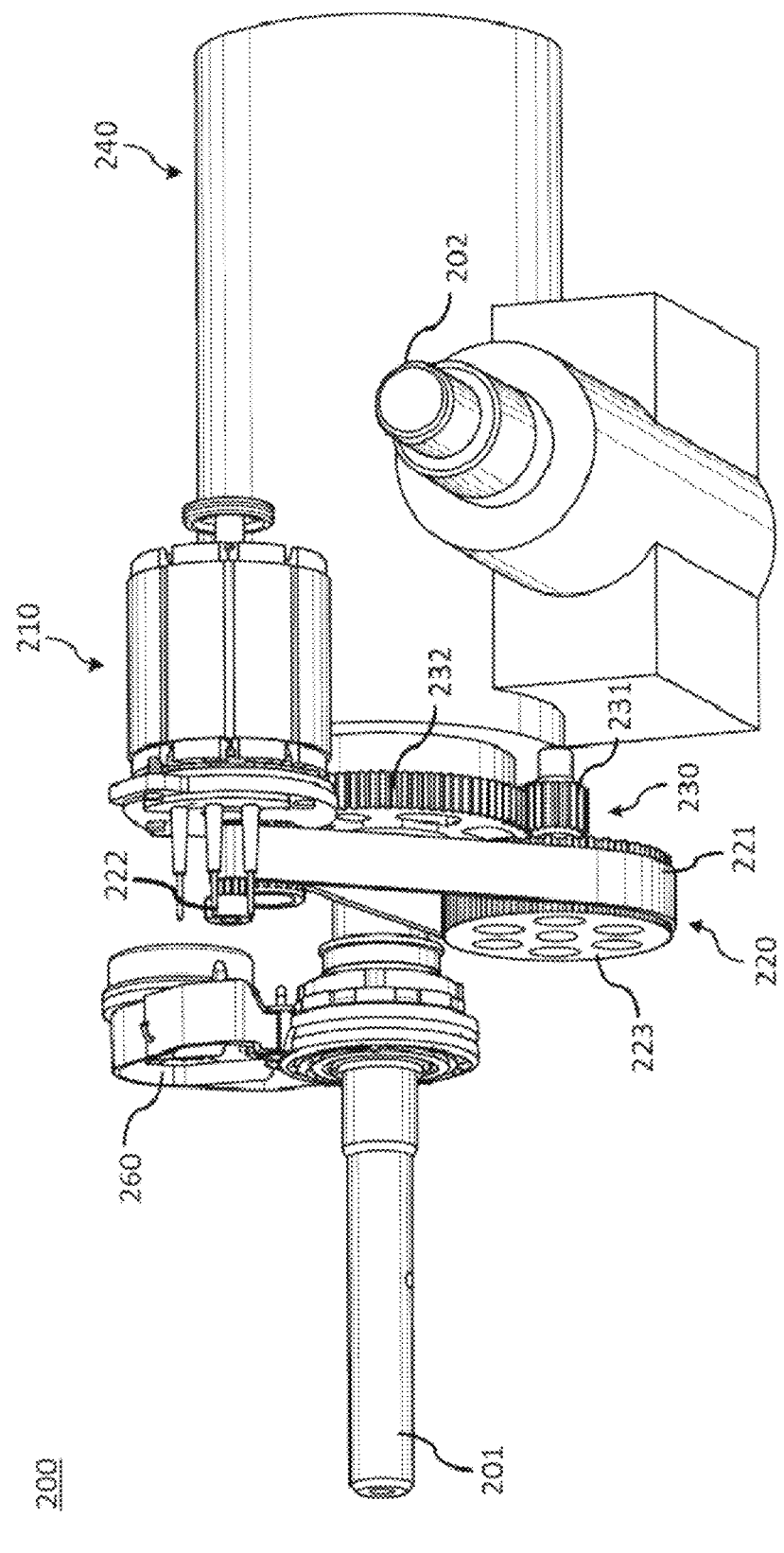
FIG. 2 shows a first perspective view of a steering mechanism according to an exemplary embodiment of the present disclosure.

Referring now to FIG. 1, a steering system 100 for use in a vehicle is illustrated. The vehicle steering system 100 allows a driver or operator of the vehicle to control the direction of the vehicle through the manipulation of the steering system 100. The vehicle steering system 100 transfers rotation and torque from a steering wheel 105 to a pitman arm 185, which may move a steering linkage 190 including, for example, but not limited to, a relay rod, tie rods and knuckles, in order to reposition one or more vehicle wheels 195. Accordingly, when the steering wheel 105 is turned, the vehicle wheels 195 are turned through movement of the steering linkage 190. An example of the vehicle steering system is disclosed in U.S. Patent Application Publication No. 2021/0261188, the contents of which are incorporated by reference herein in its entirety.

A steering column 110 is attached to the steering wheel 105, and includes various linkages, sensors, switches, and accessories. The steering column 110 provides mechanical manipulation of the vehicle wheels 195 in order to control the direction of the vehicle. The steering wheel 105 is positioned so that the driver can apply a rotational force to the steering column 110. For example, an upper portion of the steering column 110 is secured to the steering wheel 105, and a lower portion of the steering column 110 is secured to a steering mechanism 200. As a rotational force is applied to the steering column 110, through the manipulation of the steering wheel 105 or other applied force, an input shaft 201 of the steering mechanism 200 illustrated in FIGS. 2 to 5 is accordingly rotated. The steering mechanism 200 will be described in further detail later.

The vehicle steering system 100 may include a controller 180. The controller 180 may include one or more components with a processor, a storage medium and/or programmable memory, which are capable of storing and executing one or more algorithms, commands, signals, instructions or methods to effect control of the vehicle steering system 100 and, possibly, other components of the vehicle. The controller 180 may be in communication with the steering mechanism 200, numerous sensors and communication systems of the vehicle. Each component of the controller 180 may include distributed controller architecture, such as a microprocessor-based electronic control unit (ECU). Additional modules or processors may be presented within the controller 180.

The vehicle steering system 100 shown in FIG. 1 is illustrative only and other types of steering may be used with the vehicle steering system 100. FIG. 1 illustrates a power assist steering system that includes a mechanical connection between the hand wheel 105 and the steering mechanism 200. Alternatively, and in applications in which a "steer-by-wire" system is employed, there is no direct mechanical connection between the steering wheel 105 and the steering mechanism 200. In this application, the driver's rotational movement of the steering wheel 105 (and/or signal from an equivalent driver control device such as a joystick, pedal(s) and other mechanism for manipulation by the driver) is input into the controller 180 while the steering mechanism 200 provides the necessary force to manipulate the steering linkage 190.

Referring now to FIGS. 2 to 5, the steering mechanism 200 is illustrated in greater detail.

The steering mechanism 200 is configured to combine a first torque transferred from the steering column 110, or another input unit, to an input shaft 201 and a second torque generated from a motor 210, and to transfer torque to and from the pitman arm 185 of FIG. 1 via an output shaft 202. The input shaft 201 is operatively connected to the steering column 110 directly or indirectly through one or more linkages. Alternatively, the input shaft 201 may be connected to other, alternative input means or may not be mechanically connected to the steering column 110.

The motor 210 is configured to selectively generate torque in response to command signals generated by one or more sensors 260, the controller 180, or other components and sensors. This torque may be referred to as assist torque or boost torque. The motor 210 may be an electric motor, such as an Electric Power Steering (EPS) motor. The direction or amount of torque delivered by the motor 210 may be variably delivered based upon, in part, the signals from one or more sensors 260, the controller 180, or other components and sensors. Furthermore, the motor 210 may be controlled for use with other vehicle systems, including, but not limited to, electronic stability control, parking assist, and lane-departure. The motor 210 can assist the operator or driver in rotating the input shaft 201 or a rotatable part 241 of the rotary-linear conversion mechanism 240, and boost the torque and power delivered to the output shaft 202.

The torque generated by the motor 210 is transferred to the output shaft 202 through a belt assembly 220, a gear assembly 230, the rotary linear conversion mechanism 240, and a sector gear 250. The combined use of the belt assembly 220, the gear assembly 230, the rotary-linear conversion mechanism 240, and the sector gear 250 enables the motor 230 to generate the required steering torque, while meeting system backdrive performance requirements and current draw power requirements.

The belt assembly 220 may comprise a belt 221, a drive pulley 222, and a driven pulley 223.

The drive pulley 222 may be formed directly on, or attached to, a rotor shaft of the motor 210. For example, the drive pulley 222 may be formed on or adjacent to a distal end of the rotor shaft of the motor 210. In an exemplary embodiment, the drive pulley 224 may be directly machined on the circumferential surface of the rotor shaft of the motor 210 to be coupled with the belt 221. In another embodiment, instead of machining the drive pulley 221 on the circumferential surface of the rotor shaft of the motor 210, the drive pulley 221 may be mounted to and pressed in the rotor shaft of the motor 210 as a separate piece from the rotor shaft of the motor 210.

The drive pulley 222 and the driven pulley 223 are rotatably connected to each other via the belt 221. The drive pulley 222 and the driven pulley 223 may have an outer surface that engages an inner surface of the belt 221. The outer surface of the drive pulley 222 and the driven pulley 223 can have any suitable contour or texture to help ensure a gripping contact between the belt 221 and the pulley 222, 223. For example, the outer surface of the toothed pulleys 222, 223 and the inner surface of the drive belt 221 can include toothed mating protrusions and/or notches formed therein. The drive pulley 222 and the driven pulley 223 may have alternating teeth and grooves on their outer surfaces to be meshed with alternating grooves and teeth formed on the inner surface of the drive belt 221.

The belt 221 is fit relatively snugly about the outer circumferences of the drive pully 222 and the driven pulley 223. Thus, rotational movement of the drive pulley 222 causes rotation of the driven pulley 223. The diameters of the pulleys 222 and 223 can be any suitable dimension for providing any desired gear ratio, such that the rotational speed or torque of the drive pulley 222 is different from the rotational speed or torque of the driven pulley 223. For example, the diameter of the driven pulley 222 is greater than the diameter of the drive pulley 221 in order to reduce the rotation speed and increase the torque transferred to the gear assembly 230.

The belt 221 may be made from any suitable material or combination of materials flexible enough to loop around the pulleys 222 and 223 and maintain engagement with the outer surfaces of the pulleys 222 and 223 during rotation thereof. The belt 221 may be, for example, but not limited to, a synchronous drive belt, a vee belt or a cog belt, or may be made of individual links forming a chain. The belt 221 may be made of an elastomeric material, and may include internal metallic reinforcing members.

The driven pulley 222 of the belt assembly 220 is operably coupled to one of gears of the gear assembly 230 for common rotation therewith. The driven pulley 222 of the belt assembly 220 is directly or indirectly connected to one of gears of the gear assembly 230. In the exemplary embodiment illustrated in FIGS. 2 to 5, the gear assembly 230 comprises a first gear 231 and a second gear 232. The first gear 231 is fixedly connected to the driven pulley 222 of the belt assembly 220 for common rotation therewith. For example, a connecting shaft 233 fixedly connects the driven pulley 222 of the belt assembly 220 to the first gear 231 of the gear assembly 230 in order to deliver the rotary torque of the driven pulley 222 of the belt assembly 220 to the first gear 231 of the gear assembly 230. However, instead of the connecting shaft 233, any means or structure which is capable of rotating the driven pulley 222 of the belt assembly 220 and the first gear 231 of the gear assembly 230 together can be used. For example, the driven pulley 222 of the belt assembly 220 and the first gear 231 of the gear assembly 230 are manufactured as one piece unit without the connecting shaft 233. And, the first gear 231 may be, for example, but not limited to, a spur gear or a helical gear.

The first gear 231 fixedly connected to the driven pulley 222 of the belt assembly 220 is meshed with a second gear 232 directly or indirectly coupled to the input shaft 201 or a rotatable part 241 of the rotary-linear conversion mechanism 240. Accordingly, rotary motion of the first gear 231 causes the second gear 232 to rotate to transmit rotational motion.

The second gear 232 may be formed directly on, or attached to, the input shaft 201, the rotatable part 241 of the rotary-linear conversion mechanism 240, or a part connecting between the input shaft 201 and the rotatable part 241 of the rotary-linear conversion mechanism 240. In an exemplary embodiment, the second gear 232 is fixed on the input shaft 201, the rotatable part 241 of the rotary-linear conversion mechanism 240, or a part connecting between the input shaft 201 and the rotatable part 241 of the rotary-linear conversion mechanism 240. Alternatively, the second gear 232 may be directly machined on the circumferential surface of the input shaft 201, the rotatable part 241 of the rotary-linear conversion mechanism 240, or a part connecting between the input shaft 201 and the rotatable part 241 of the rotary-linear conversion mechanism 240. For example, the second gear 232 may be a toothed part formed on the outer circumferential surface of the input shaft 201, the rotatable part 241 of the rotary-linear conversion mechanism 240, or a part connecting between the input shaft 201 and the rotatable part 241 of the rotary-linear conversion mechanism 240. One or more additional gears may be incorporated between the first gear 231 and the second gear 232 to meet speed and torque requirements.

The diameters of the first gear 231 and the second gear 232 can be any suitable dimension for providing any desired gear ratio, such that the rotational speed or torque of the first gear 231 is different from the rotational speed or torque of the second gear 232. For example, the diameter of the second gear 232 is greater than the diameter of first gear 231 in order to reduce the rotation speed and increase the torque transferred to the input shaft 201 and/or the rotary-linear conversion mechanism 240.

The input shaft 201 is operably coupled to the rotatable part 241 of the rotary-linear conversion mechanism 240 in order to transfer torque to and from the rotatable part 241 of the rotary-linear conversion mechanism 240. Accordingly, the rotary motion of the input shaft 201 can cause the rotatable part 241 of the rotary-linear conversion mechanism 240 to rotate. The input shaft 201 may be fixedly connected to the rotatable part 241 of the rotary-linear conversion mechanism 240 for common rotation therewith. The input shaft 201 may be formed as an integral, one-piece member with the rotatable part 241 of the rotary-linear conversion mechanism 240, be directly coupled to the rotatable part 241 of the rotary-linear conversion mechanism 240, or be indirectly coupled to the rotatable part 241 of the rotary-linear conversion mechanism 240 through one or more components connecting between the input shaft 201 and the rotatable part 241 of the rotary-linear conversion mechanism 240. Accordingly, the input shaft 201, at least one gear of the gear assembly 230, and the rotatable part 241 of the rotary-linear conversion mechanism 240 are operably connected for common rotation therewith.

Additionally, because the second gear 232 is connected to the input shaft 201, the rotatable part 241 of the rotary-linear conversion mechanism 240, or a component connecting between the input shaft 201 and the rotatable part 241 of the rotary-linear conversion mechanism 240, rotary motion of the second gear 232 causes rotation of the rotatable part 241 of the rotary-linear conversion mechanism 240.

Accordingly, the first torque transferred from the steering column 110 through the input shaft 201 and the second torque transferred from the motor 210 through the belt assembly 220 and the gear assembly 230 can be transferred to the rotatable part 241 of the rotary-linear conversion mechanism 240.

The rotary-linear conversion mechanism 240 is configured to convert the rotary motion of the rotatable part 241 to a linear motion of a translatable part 242. The translatable part 242 is configured to be linearly movable in response to the rotation of the rotatable part 241.

Figure 3:
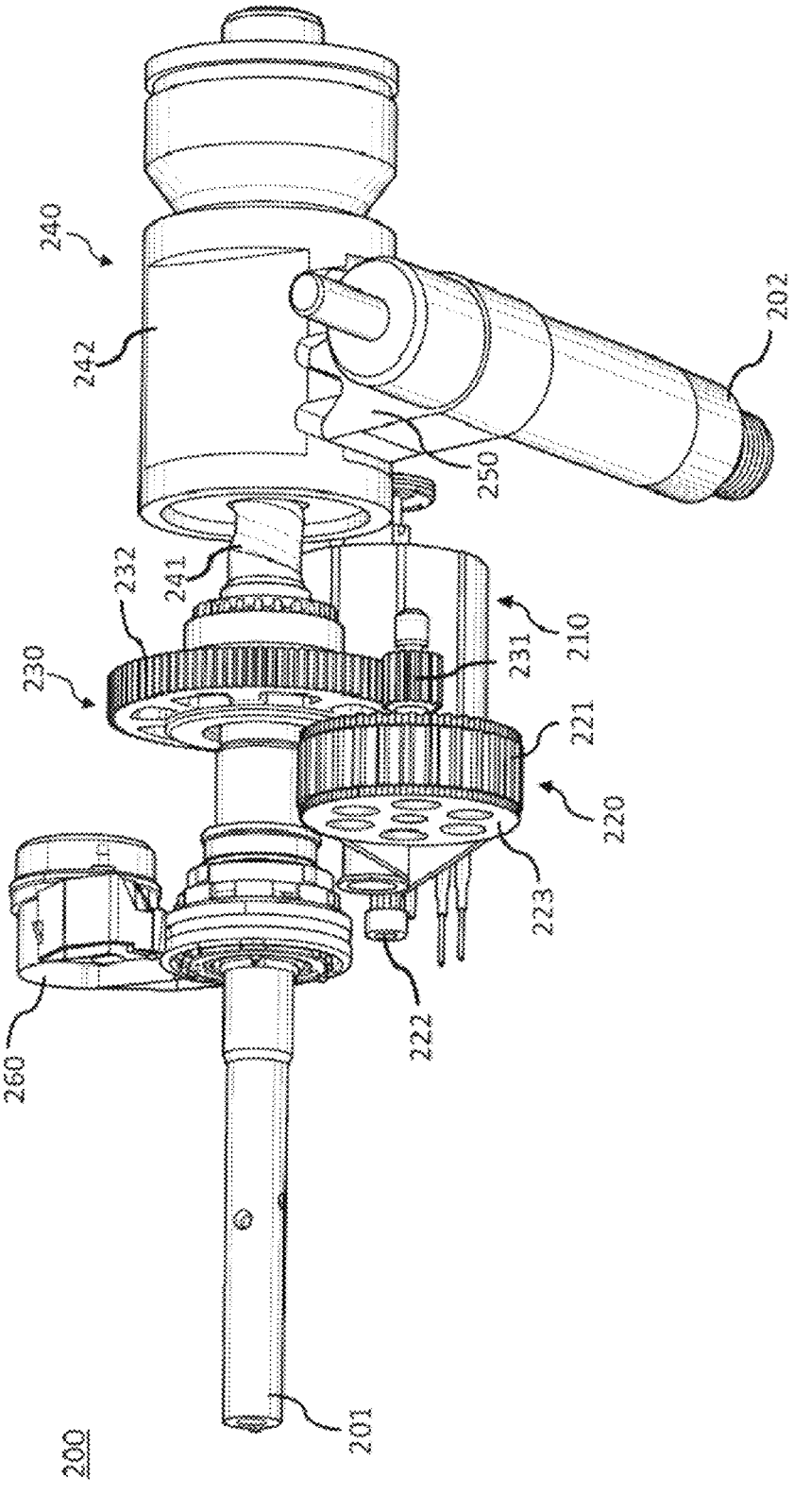
FIG. 3 shows a second, opposite perspective view of a steering mechanism according to an exemplary embodiment of the present disclosure.
Figure 4:
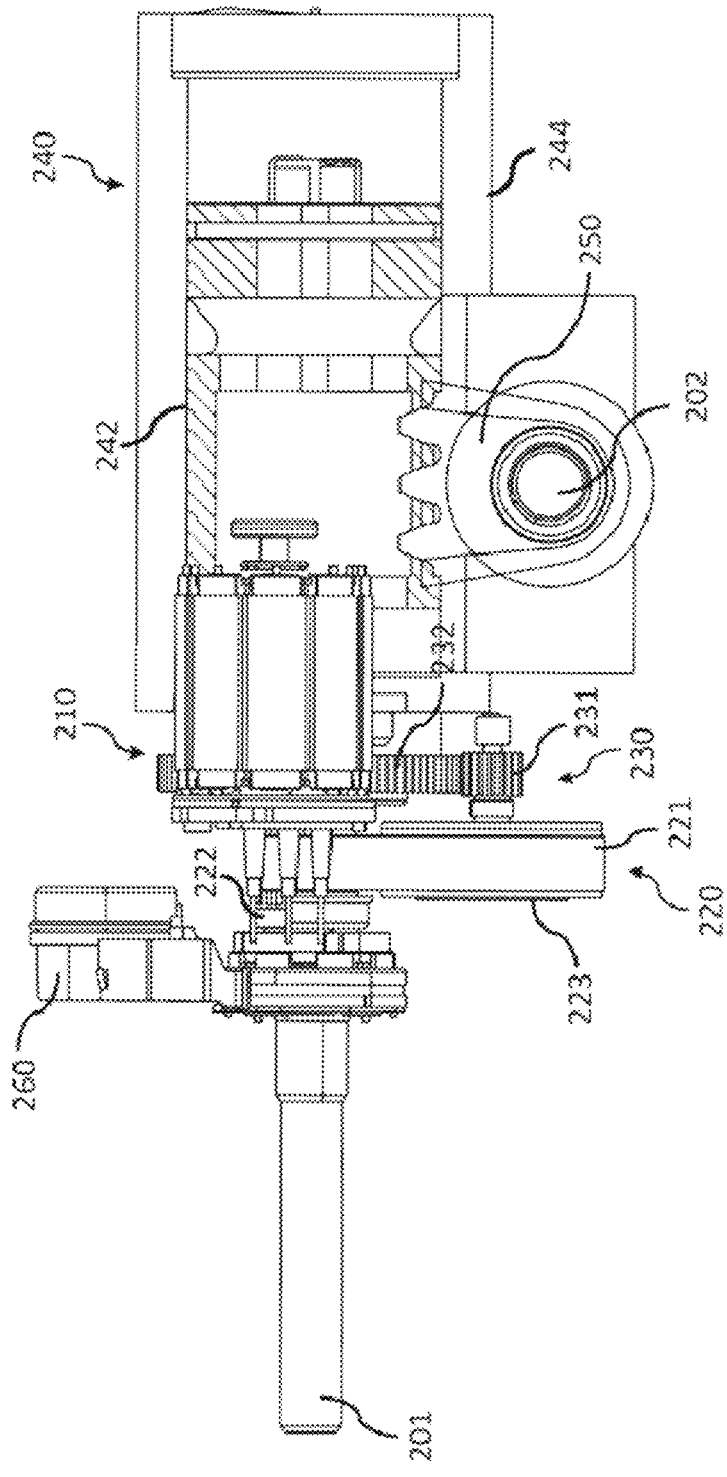
FIG. 4 shows a partially transparent view of a steering mechanism according to an exemplary embodiment of the present disclosure.
Figure 5:
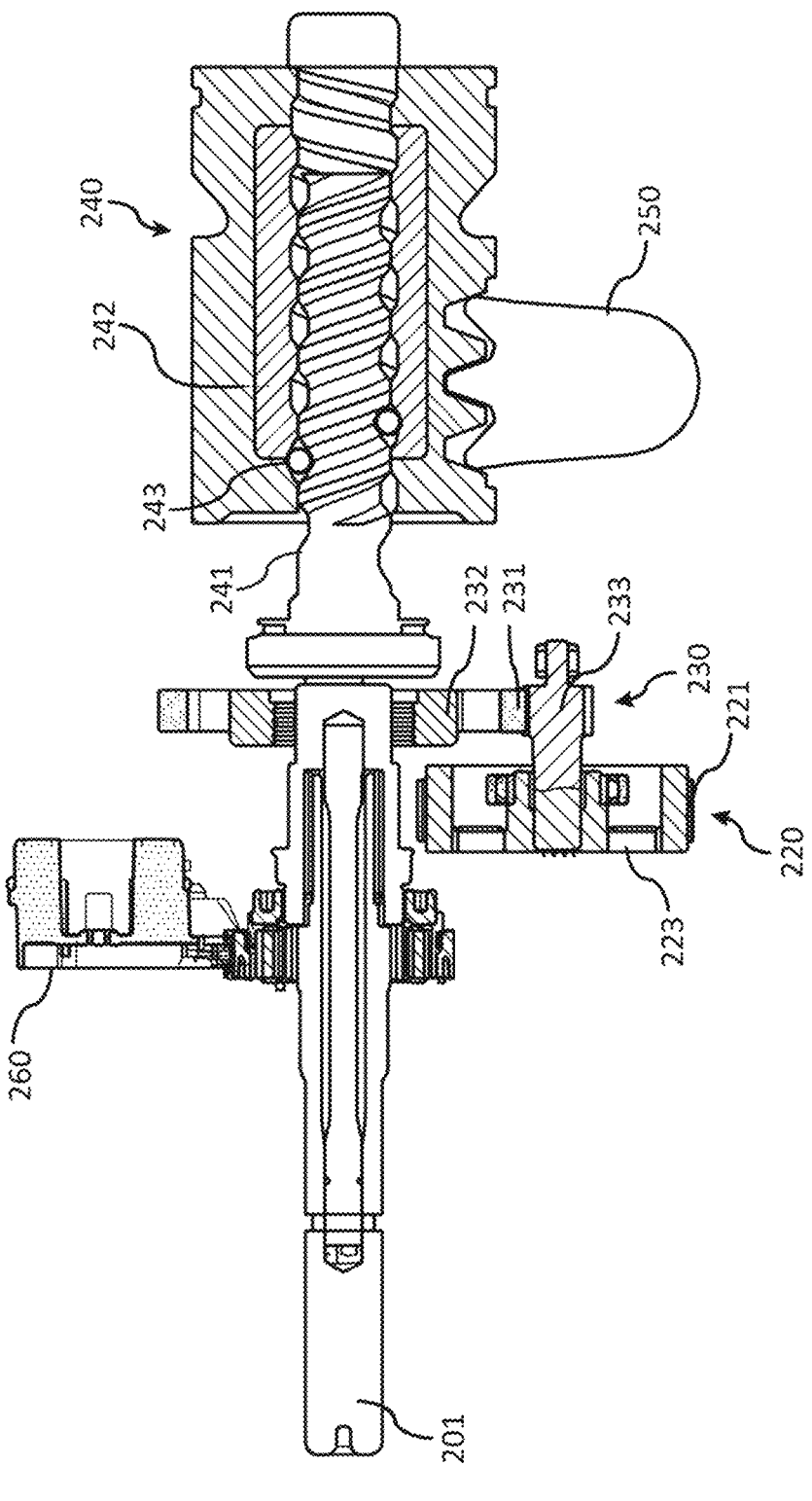
FIG. 5 shows a cross-sectional view of a steering mechanism according to an exemplary embodiment of the present disclosure.

In the exemplary embodiment, the rotary-linear conversion mechanism 240 can be implemented as a ball screw type, but not limited thereto. The rotatable part 241 may be a ball screw, and the translatable part 242 may be a ball nut. The ball nut 242 circumscribes the ball screw 241 and is torque-transfer communication with the ball screw 241 through a plurality of rolling bodies 243, such balls or bearings, which circulate between the ball screw 241 and the ball nut 242. Ball returns either internally or externally carry the rolling bodies 243 from the end of their path back to the beginning to complete their recirculating track. A housing 244 surrounds the ball nut 242 and guides linear movement of the ball nut 242, such that the ball nut 242 slides but does not rotate within the housing 244. In FIGS. 3 to 5, portions of the housing 244 are removed or cross-sectioned to illustrate the workings of the rotary-linear conversion mechanism 240. Rotation of the input shaft 201 and the torque generated by the motor 210 cause the rotatable part 241 (e.g. the ball screw) to rotate. As the rotatable part 241 (e.g. the ball screw) rotates, the rotation of the rotatable part 241 (e.g. the ball screw) is transferred to the translatable part 242 (e.g. the ball nut) to cause linear movement of the translatable part 242 (e.g. the ball nut).

The translatable part 242 of the rotary-linear conversion mechanism 240 is operably coupled to the sector gear 250. The sector gear 250 may be configured to convert the linear motion of the translatable part 242 of the rotary-linear conversion mechanism 240 to rotary motion to rotate the output shaft 202. In other words, the sector gear 250 may be configured to rotate the output shaft 202 in response to the linear motion of the translatable part 242 of the rotary-linear conversion mechanism 240. The sector gear 250 may have a plurality of teeth. For example, the toothed portions formed on the outer surface of the translatable part 242 of the rotary-linear conversion mechanism 240 are meshed with the sector gear 250. The output shaft 202 may be rigidly attached, such as through a splined connection, to the pitman arm 185. The output shaft 202 and the pitman arm 185 rotate in common. As the sector gear 250 rotates, the output shaft 202 is rotated to operate the steering linkage 190 of FIG. 1. Therefore, linear movement of the translatable part 242 (e.g. the ball nut) of the rotary-linear conversion mechanism 240 causes rotation of the output shaft 202, such that movement of the input shaft 201 and the torque generated the motor 210 can result in movement of the output shaft 202 and the pitman arm 185.

One or more sensors 260, such as a torque sensor, a position sensor, or a force sensor, may be arranged in the steering mechanism 200. The sensor 260 shown in FIGS. 2 to 5 is schematic and illustrative only, and any locations of the sensors 260 within the steering mechanism 200 are shown only to illustrate possible locations. The sensor 260 may monitor the torque and displacement of the input shaft 201 from the vehicle operator's or driver's inputs. And, the sensor 260 may measure a reaction torque, which is the torque reacting or pushing back against steering commands from the operator or driver. The reaction torque may be viewed as a torque differential between the steering commands input from the steering column 110 and the actual torque transferred to the vehicle wheels 195.

According to an exemplary embodiment of the present disclosure, the torque generated by the motor 210 is transferred to the output shaft 202 through the belt assembly 220, the gear assembly 230, the rotary-linear conversion mechanism 240, and the sector gear 250, thereby improving mechanical efficiency, reducing back-drive torque, and providing a multi-stage reduction mechanism to generate the required pitman torque from an EPS motor. The combined use of the belt assembly 220, the gear assembly 230, the rotary-linear conversion mechanism 240, and the sector gear 250 can enable to an electric motor to generate required steering torque, while meeting system back-drive performance requirements and current draw power requirements. Further, the combined use of the belt assembly 220, the gear assembly 230, the rotary-linear conversion mechanism 240, and the sector gear 250 can provide the optimized force assistance to oppose system and vehicle loads to aid an operator or driver in achieving the desired output.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A vehicle steering system, comprising:
an input shaft configured to be rotatable in response to an input for moving one or more vehicle wheels;
a motor configured to selectively generate torque to be supplied to an output shaft through a belt assembly, a gear assembly, a rotary-linear conversion mechanism, and a sector gear,
the rotary-linear conversion mechanism operably connected with the input shaft and the motor, the rotary-linear conversion mechanism configured to convert rotary motion, caused by one or combination of rotary motion of the input shaft and the torque transferred from the motor, to linear motion;
the belt assembly comprising a belt configured to be rotatable by the torque generated by the motor;
the gear assembly comprising one or more gears configured to be rotatable in response to rotary motion of the belt, wherein rotary motion of one of the gears causes the rotary motion of the rotary-linear conversion mechanism which is converted to the linear motion by the rotary-linear conversion mechanism; and
the sector gear operably connected with the output shaft, the sector gear configured to convert the linear motion of the rotary-linear conversion mechanism to rotary motion so that the sector gear rotates the output shaft in response to the linear motion of the rotary-linear conversion mechanism,
wherein the rotary-linear conversion mechanism comprises:
a rotatable part coupled to the input shaft to be rotated in association with the rotation of the input shaft; and
a translatable part configured to be linearly movable in response to rotation of the rotatable part, the translatable part operably coupled to the sector gear so that linear motion of the translatable part of the rotary-linear conversion mechanism is converted to the rotary motion by the sector gear,
wherein torque input from the input shaft and torque generated by the motor are transmitted to one side of the rotatable part in a same direction,
wherein the belt assembly comprises a driven pully configured to be rotatable by the belt, the driven pully coupled to an other of the gears which is meshed with the one of the gears, and the one of the gears is operably coupled to the rotatable part of the rotary-linear conversion mechanism so that rotary motion of the one of the gears causes rotation of the rotatable part of the rotary-linear conversion mechanism, and
the one of the gears is formed on a part connecting the input shaft and the rotatable part.

2. The vehicle steering system according to claim 1, wherein:
the rotatable part of the rotary-linear conversion mechanism is a ball screw and the translatable part of the rotary-linear conversion mechanism is a ball nut, and
the rotary-linear conversion mechanism further comprises rolling bodies movably disposed between the ball screw and the ball nut.

3. The vehicle steering system according to claim 1, wherein:
the belt assembly further comprises a drive pulley which is rotatably connected to the driven pulley via the belt,
the drive pulley of the belt assembly is formed on or coupled to a shaft of the motor so that rotary motion of the shaft of the motor causes rotation of the drive pulley of the belt assembly, and
the rotary motion of the driven pulley of the belt assembly causes rotation of the other of the gears which causes rotation of the one of the gears.

4. The vehicle steering system according to claim 3, wherein a diameter of the driven pulley of the belt assembly coupled to the other of the gears is greater than a diameter of the drive pulley of the belt assembly coupled to the shaft of the motor.

5. The vehicle steering system according to claim 1, wherein a diameter of the other of the gears which is coupled to the driven pulley of the belt assembly is smaller than a diameter of the one of the gears which is coupled to the rotatable part of the rotary-linear conversion mechanism.

6. The vehicle steering system according to claim 1, wherein the output shaft is operably connected to a pitman arm to rotate the pitman arm in response to rotary movement of the output shaft.

7. The vehicle steering system according to claim 1, further comprising a sensor configured to detect motion or torque at the input shaft.

8. The vehicle steering system according to claim 3, wherein the shaft of the motor and the input shaft are parallel to each other.

9. The vehicle steering system according to claim 1, wherein:
the input shaft is fixedly coupled to and axially aligned with a rotatable part of the rotary-linear conversion mechanism,
the motor is operably connected to the rotatable part of the rotary-linear conversion mechanism so that the torque generated by the motor is transferred to the rotatable part of the rotary-linear conversion mechanism through the belt assembly and the gear assembly, and
the rotary-linear conversion mechanism is configured to combine the rotary motion of the input shaft and the torque transferred from the motor.

10. The vehicle steering system according to claim 1, wherein the one of the gears of the gear assembly is a spur gear or a helical gear fixedly attached to the input shaft or a rotatable part of the rotary-linear conversion mechanism.

11. The vehicle steering system according to claim 3, further comprising a connecting shaft fixedly connecting the driven pulley of the belt assembly to the other of the gears of the gear assembly.

12. The vehicle steering system according to claim 1, wherein the input shaft is operably coupled with a steering column so that rotation of a steering wheel causes the input shaft to rotate.

* * * * *